US012730315B2

(12) United States Patent
Simonis et al.

(10) Patent No.: US 12,730,315 B2
(45) Date of Patent: Sep. 8, 2026

(54) HEAD-UP DISPLAY DEVICE FOR A MOTOR VEHICLE AND METHOD FOR PRODUCING A HEAD-UP DISPLAY DEVICE

(71) Applicant: VALEO SCHALTER UND SENSOREN GMBH, Bietigheim-Bissingen (DE)

(72) Inventors: Karl Simonis, Bietigheim-Bissingen (DE); Oezguer Salmanoglu, Bietigheim-Bissingen (DE); Fatih Dilaver, Bietigheim-Bissingen (DE); Daniel Kuntze, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 360 days.

(21) Appl. No.: 18/575,884

(22) PCT Filed: Jun. 23, 2022

(86) PCT No.: PCT/EP2022/067145

§ 371 (c)(1),
(2) Date: Jan. 2, 2024

(87) PCT Pub. No.: WO2023/274827

PCT Pub. Date: Jan. 5, 2023

(65) Prior Publication Data

US 2024/0241373 A1 Jul. 18, 2024

(30) Foreign Application Priority Data

Jul. 1, 2021 (DE) ......................... 102021117006.0

(51) Int. Cl.

| | |
|---|---|
| ***G02B 27/01*** | (2006.01) |
| ***B60K 35/231*** | (2024.01) |
| ***F16B 13/12*** | (2006.01) |

(52) U.S. Cl.

CPC ........ *G02B 27/0149* (2013.01); *B60K 35/231* (2024.01); *F16B 13/126* (2013.01); *G02B 2027/0161* (2013.01)

(58) Field of Classification Search

None

See application file for complete search history.

(56) References Cited

U.S. PATENT DOCUMENTS

| | | | | |
|---|---|---|---|---|
| 5,664,901 A * | 9/1997 | Mayr | .................... | F16B 37/122 411/181 |
| 2008/0014043 A1 * | 1/2008 | Zasloff | .................. | F16B 13/126 248/220.31 |

(Continued)

FOREIGN PATENT DOCUMENTS

| | | |
|---|---|---|
| CN | 101328920 A | 12/2008 |
| DE | 202005005629 U1 | 8/2006 |

(Continued)

OTHER PUBLICATIONS

International Search Report issued in corresponding German Patent Application No. DE 10 2021 117 006.0 mailed Mar. 11, 2022 (4 pages).

(Continued)

*Primary Examiner* — Phu Vu

(74) *Attorney, Agent, or Firm* — Osha Bergman Watanabe & Burton LLP

(57) ABSTRACT

A head-up display device for a motor vehicle is disclosed. The device includes a housing part in which an image-generating unit of the display device is arranged. The image-generating unit is configured to project an image onto a light-permeable projection surface. The image-generating unit includes a cover element which is connected to the housing part and covers regions of the housing part with respect to the surroundings of the display device. The cover element includes a peg element which is inserted into a (Continued)

corresponding receptacle formed in the housing part. The peg element is expanded with a spreading piece inserted into the peg element. The peg element is fixed in the receptacle as a result of the expansion.

12 Claims, 6 Drawing Sheets

(56) References Cited

U.S. PATENT DOCUMENTS

| | | | | |
|---|---|---|---|---|
| 2017/0160551 | A1 | 6/2017 | Azuma | |
| 2018/0218654 | A1 | 8/2018 | Hashimoto et al. | |
| 2019/0146218 | A1 | 5/2019 | Yamazoe et al. | |
| 2019/0162965 | A1 | 5/2019 | Han et al. | |
| 2023/0258971 | A1* | 8/2023 | Kang | B60K 35/23<br>349/64 |

FOREIGN PATENT DOCUMENTS

| | | | |
|---|---|---|---|
| DE | 102011080178 | A1 | 2/2013 |
| DE | 102007010381 | B4 | 2/2015 |
| DE | 102016122419 | A1 | 5/2018 |
| DE | 102018106169 | A1 | 9/2019 |
| DE | 102018114903 | A1 | 12/2019 |
| DE | 102018120926 | A1 | 3/2020 |
| EP | 3686650 | A1 | 7/2020 |

OTHER PUBLICATIONS

International Search Report issued in corresponding International Application No. PCT/EP2022/067145 mailed Oct. 18, 2022 (6 pages).

Written Opinion issued in corresponding International Application No. PCT/EP2022/067145 mailed Oct. 18, 2022 (6 pages).

Office Action issued in corresponding China Application No. 202280046788.2, dated Apr. 22, 2026. (19 pages).

* cited by examiner

HEAD-UP DISPLAY DEVICE FOR A MOTOR VEHICLE AND METHOD FOR PRODUCING A HEAD-UP DISPLAY DEVICE

The invention relates to a head-up display device for a motor vehicle, having a housing part, in which an image-generating unit of the display device is arranged. The image-generating unit is designed to project an image onto a light-permeable projection surface. A cover element is connected to the housing part, wherein the cover element covers regions of the housing part with respect to the surroundings of the display device. The cover element has a peg element, which is inserted into a corresponding receptacle formed in the housing part. The invention also relates to a method for producing such a head-up display device.

DE 10 2007 010 381 B4 describes a head-up display for a motor vehicle, for mounting in the region of a dashboard of the motor vehicle. The head-up display comprises a first, lower housing part and a second, upper housing part. Mirror optics with two mirrors and control electronics are arranged in the lower housing part. A cover plate is arranged on the upper housing part, said cover plate terminating the head-up display at the top and being used, inter alia, to protect the display from dust. The two housing parts are connected to one another detachably, to which end fastening means are provided. The fastening means can comprise latching pegs on one housing part, which engage in corresponding latching receptacles in the other housing part.

The object of the present invention is to create a head-up display device of the type mentioned at the outset in which particularly secure positioning of the cover element on the housing part is achieved and to specify a method for producing such a head-up display device.

This object is achieved by a head-up display device having the features of claim 1 and by a method having the features of claim 12. Advantageous embodiments with expedient developments of the invention are specified in the dependent claims and in the following description.

The head-up display device according to the invention for a motor vehicle comprises a housing part, in which an image-generating unit of the display device is arranged. The image-generating unit is designed to project an image onto a light-permeable projection surface. The display device comprises a cover element, which is connected to the housing part. The cover element covers regions of the housing part with respect to the surroundings of the display device. The cover element has a peg element, which is inserted into a corresponding receptacle formed in the housing part. The peg element is expanded by means of a spreading piece inserted into the peg element, wherein the peg element is fixed in the receptacle as a result of the expansion.

During production of the display device or during mounting of the display device or head-up display device, the peg element can thus be initially introduced into the receptacle with sufficient play and therefore very easily. The peg element is then expanded by subsequently inserting the spreading piece into the peg element designed in the manner of an expansion anchor. In other words, the peg element is widened or spread by means of the spreading piece in the same manner as when a screw is screwed into an anchor. This expansion of the peg element or this spreading apart of at least two portions of the peg element in turn ensures firm and durable fixing of the peg element in the receptacle. The peg element fixed in the receptacle is therefore secured against coming undone or moving out of the receptacle. Consequently, the cover element is positioned on the housing part very securely and precisely.

This is advantageous in particular with regard to the fact that dust- and/or spray-proof covering of the housing part by means of the cover element can be achieved in this way. In addition, such a connection of the cover element to the housing part, in which connection the spreading piece is inserted into the peg element, can be implemented in a technically simple and at the same time process-reliable manner.

The peg element, which is in particular designed in the manner of an anchor-like shaping of the cover element, thus preferably acts both as a spreadable or expandable anchor and as a centering peg or positioning peg at the same time. This is advantageous with regard to the precise positioning of the cover element on the housing part.

The positioning and fixing, achieved by means of the expanded or spread peg element, of the cover element on the housing part can also be implemented very cost-effectively. This is because both the spreading piece and the peg element themselves can be provided or produced very cost-effectively.

In the case of the head-up display device designed as a head-up display, which is also referred to synonymously in the present case simply as display device for the sake of simplicity, the image-generating unit can project the image onto a light-permeable projection surface in the form of a windshield of the motor vehicle during operation. Furthermore, it is possible by means of the image-generating unit or image output device of the display device to project the image onto a screen designed as a so-called combiner that is light-permeable and reflects the image and is designed as a separate component part from the windshield of the motor vehicle.

To fix the peg element in the receptacle, the peg element expanded or spread by means of the spreading piece can form a form fit with the housing part in the region of the receptacle. To this end, provision can be made for at least one protruding region of the expanded peg element to engage behind a material region of the housing part in which the receptacle is formed.

As a result of the expansion, the peg element is preferably braced against a wall delimiting the receptacle. This produces a force-fitting connection between the wall delimiting the receptacle and provided by the housing part and an outside of the peg element, said force-fitting connection resulting from the pressure of the peg element against the wall. Particularly secure and precise, in particular play-free, and also very process-reliable fixing of the peg element in the receptacle can thus be achieved. In this way, manufacturing tolerances on the part of the peg element and/or on the part of the receptacle can also be compensated for well and easily.

In particular when the peg element is fixed in the receptacle in an at least largely play-free manner as a result of the expansion, very good centering of the peg element in the receptacle can also be achieved.

The receptacle can be provided in the housing part particularly simply when the receptacle is in the form of a drilled hole. In particular, such a drilled hole can be in the form of a through-opening in a corresponding portion or material region of the housing part.

Preferably, the cover element is connected to the housing part by means of at least one further fastening means, which is different from the peg element. This ensures a particularly secure connection of the cover element to the housing part.

The at least one fastening means can be fed through a through-opening formed in the housing part and can be fixed to a further component part of the display device. As is the case in a sandwich design, the cover element acting as a covering is then connected to the further component part through the housing part. This in turn advantageously ensures very precise positioning of the further component part of the display device as well, in particular in relation to the housing part.

Preferably, the further component part has at least one fastening dome, into which the further fastening means is inserted. By means of the at least one fastening dome, precise positioning of the further component part on the housing part can be achieved. In addition, a material region of the further component part is advantageously provided by the fastening dome, into which material region the further fastening means can be easily inserted.

Preferably, the further component part is formed from a different material than the housing part. In this way, the demands placed on the further component part and on the housing part in terms of the material properties can be met well.

For example, the further component part can advantageously be formed from a cost-effective plastic. In contrast, the housing part can be formed from metal. This provides the housing part with a high degree of robustness. This is advantageous in particular for the attachment of a controller of the head-up display device to the housing part, said controller preferably being provided and designed to actuate the image-generating unit, and/or for the protected accommodation of the image-generating unit in the housing part.

The aforementioned advantages are particularly apparent in particular if the housing part is designed as a diecast part formed from metal. Furthermore, particularly precise production of the housing part is achieved in this way.

Preferably, the further component part is designed as a shielding device, by means of which an exposure of at least one component of the image-generating unit to scattered light can be at least reduced. In this way, the further component part is not just used to achieve the connection or coupling of the cover element to the housing part. Rather, the further component part advantageously also ensures that an output of images by means of the image-generating unit or image output device is impaired as little as possible.

This is because the further component part designed as a shielding device can at least reduce or as far as possible prevent an incidence of scattered light in the form of sunlight or ambient light onto components of the image-generating unit.

The shielding device can also very largely prevent an undesired reflection, within the shielding device, of light that is used to project the image onto the light-permeable projection surfaces. This is also advantageous.

For example, the shielding device can be provided on its side facing the corresponding components of the image-generating unit with a coating or the like that prevents a reflection of light as far as possible. Accordingly, such a coating of the shielding device can be matt or non-reflective, for example.

Preferably, the spreading piece is in the form of a screw. A very well controllable expansion of the peg element in the receptacle can thus be effected by an increasingly advancing screwing of the spreading piece into the peg element. Furthermore, a spreading piece in the form of a screw is very simple to handle in process terms, specifically by means of a screwdriver.

It has been found further advantageous when the at least one further fastening element is in the form of a screw. This is because the screwdriver can thus be used both to insert the spreading piece into the peg element and to screw in the at least one further fastening means. This is advantageous with regard to simple and easy mounting and production of the display device.

Preferably, the screw providing the spreading piece and/or the at least one further fastening means is formed from a plastic. Such screws are particularly cost-effective in comparison with screws produced from metal, for example.

It is also advantageous when the screws formed from plastic are designed as self-cutting screws. This is because a precisely produced thread does not then have to be provided in a complex manner on the counterpart into which the self-cutting plastic screw is inserted. Rather, the self-cutting screw gouges its own thread as it is inserted into the counterpart in question. This is also advantageous with regard to a low complexity during production or mounting of the display device.

It is advantageous when the same type of screw, in particular the same type of self-cutting plastic screw, is used both for the spreading piece and for the at least one further fastening means. This is because it is not then necessary to pay attention to which of these screws is to be used as the spreading piece for expanding the peg element and which of these screws is to be used as the at least one further fastening means. This is also advantageous with regard to simple and fast mounting and production of the display device.

In particular the use of self-cutting plastic screws both for the spreading piece and for the at least one further fastening means is advantageous with regard to process-reliable processing and with regard to costs.

Preferably, the peg element and the at least one further fastening means are arranged in respective corner regions of the cover element. In this way, both the peg element and the further fastening means are easily accessible.

It has been found further advantageous when the peg element is formed integrally with a main body of the cover element. The peg element can thus be provided in a particularly simple manner. For example, the cover element can be produced from a plastic and have the peg element formed from this plastic.

Preferably, a cut-out is formed in a side wall of the cover element, via which cut-out an electrical connection device of the display device is accessible from the surroundings of the display device. In this way, a supply of electrical energy to components of the display device, in particular to a controller of the display device designed to actuate the image-generating unit and/or to the image-generating unit, can be implemented simply, for example by inserting a connection plug or similar plug element into the electrical connection device of the display device.

In addition, an anti-rotation means for attaching the cover element to the housing part is provided by the cut-out formed in the cover element. In particular in interaction with the peg element to be inserted into the receptacle, a very precise orientation of the cover element on the housing part can thus be implemented during production or mounting of the display device.

Preferably, the side wall is sealed off from the electrical connection device in the region of the cut-out by means of a sealing element. This ensures that, despite the provision of the cut-out in the cover element, contamination, for example in the form of dust and/or water, in particular spray water, cannot pass into the housing part via the cut-out.

Preferably, the side wall has a retaining groove in the region of the cut-out, said retaining groove fitting around regions of the sealing element. This also ensures precise positioning of the sealing element.

In particular, the sealing element can be formed from an elastic foam material. By means of such a foam collar that fits around regions of the electrical connection device or that runs around regions of the electrical connection device, sealing off of an interior of the display device from the surroundings of the display device can be ensured in a very simple and at the same time effective manner.

In the method according to the invention for producing a head-up display device for a motor vehicle, a housing part of the display device is connected to a cover element of the display device. An image-generating unit of the display device is arranged in the housing part. The image-generating unit is designed to project an image onto a light-permeable projection surface. The cover element covers regions of the housing part with respect to the surroundings of the display device and has a peg element. The peg element is inserted into a corresponding receptacle formed in the housing part. The peg element is then expanded by means of a spreading piece inserted into the peg element, wherein the peg element is fixed in the receptacle as a result of the expansion.

The fixing of the peg element in the receptacle ensures that the peg element is held firmly in place in the receptacle. A particularly secure and precise positioning of the cover element on the housing part is accordingly achieved.

The advantages and preferred embodiments described for the display device according to the invention also apply to the method according to the invention, and vice versa.

The features and combinations of features mentioned above in the description and the features and combinations of features mentioned below in the description of the figures and/or shown in the figures alone may be used not only in the respectively indicated combination but also in other combinations without departing from the scope of the invention. Embodiments of the invention that are not explicitly shown and explained in the figures, but emerge and are producible from the explained embodiments by virtue of separate combinations of features, should therefore also be regarded as included and as disclosed. Embodiments and combinations of features that therefore do not have all the features of an originally formulated independent claim should also be regarded as disclosed. Furthermore, embodiments and combinations of features, in particular by way of the embodiments outlined above, that go beyond or deviate from the combinations of features outlined in the back references of the claims should be regarded as disclosed.

Further features of the invention can be found in the claims, the figures, and the description of the figures. In the figures:

FIG. 2);

Elements that are the same or have the same function are provided with identical reference signs in the figures.

Figure 1:
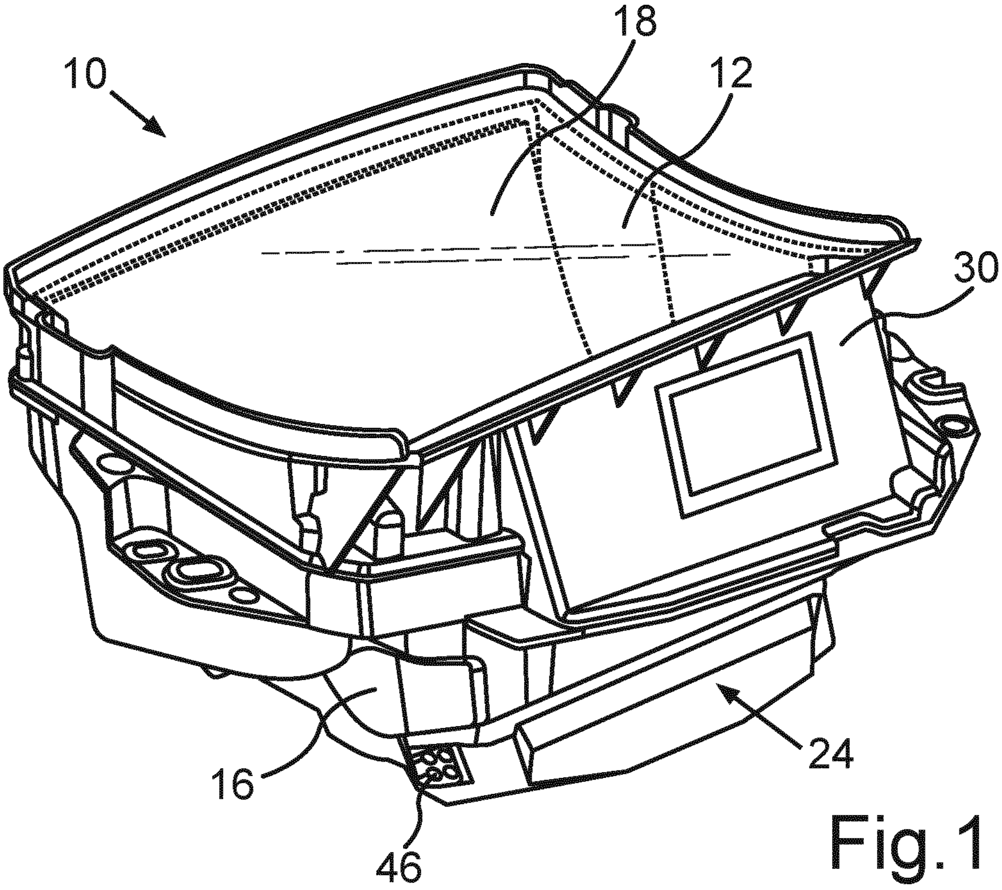
FIG. 1 shows a perspective view of a display device in the form of a head-up display for a motor vehicle, wherein the display device is shown in its installation position in the motor vehicle.

FIG. 1 perspectively shows a display device 10, in the form of a head-up display, for a motor vehicle, said display device being referred to in the present case either as a head-up display device 10 or (for reasons of simplicity) also simply as a display device 10. The display device 10 is shown in its installation position in the motor vehicle in FIG. 1. Accordingly, an image can be projected onto a windshield (not shown) of the motor vehicle through a top, transparent covering 12, which can be designed for instance as a transparent film or the like. The contents of the image are thus visible to a driver of the motor vehicle who is looking through the windshield, in the field of view of the driver.

Figure 2:
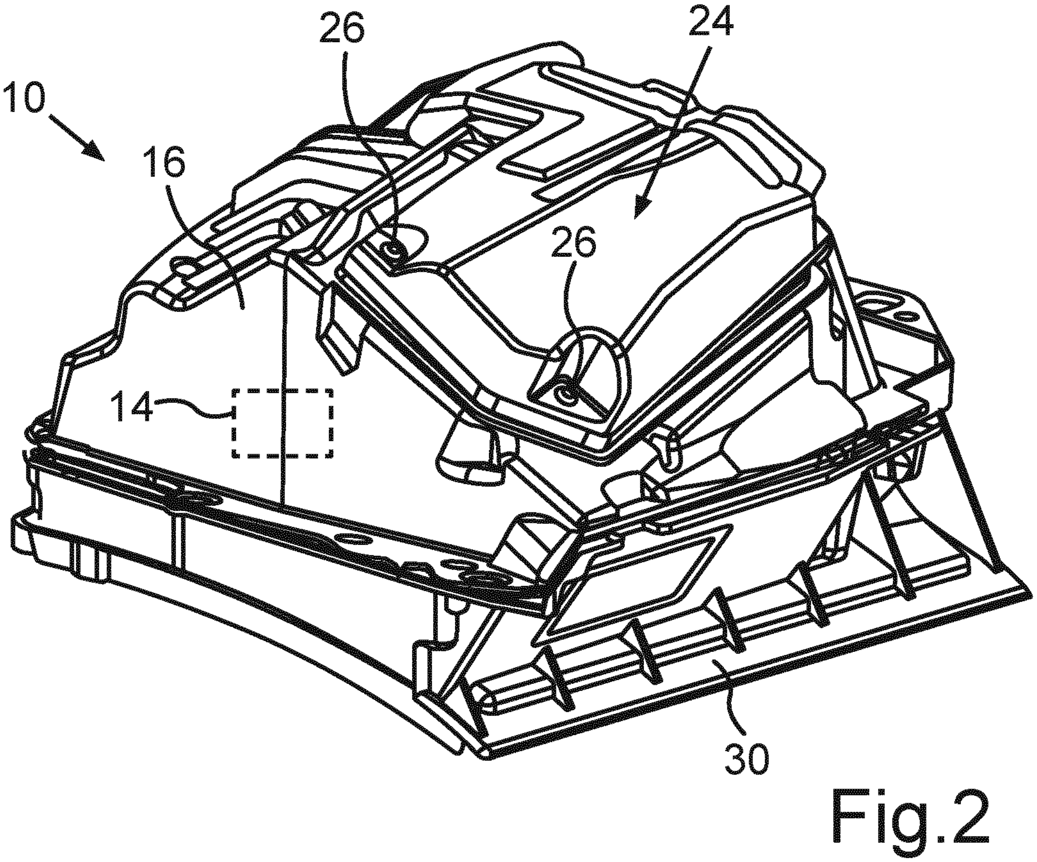
FIG. 2 shows a further perspective view of the display device according to FIG. 1, wherein more of a cover element attached to an underside of the display device can be seen than in FIG. 1.

An image-generating unit 14, designed to provide and project the image, of the display device 10 is shown schematically in FIG. 2, wherein the image-generating unit 14 is not shown realistically, either in terms of its arrangement in a housing part 16, in the present case in the form of a diecast housing, of the display device or in terms of the associated components. However, a mirror 18 of the image-generating unit 14 can be seen in FIG. 1, for example. Via this mirror 18, the image is projected through the transparent covering 12 onto the windshield (not shown) of the motor vehicle.

A controller 20 (cf. FIG. 3) for actuating the image-generating unit 14 is provided by electronic component parts, which are not specified in more detail in the present case and are arranged on a printed circuit board 22 in the embodiment of the display device 10 shown in the figures. The printed circuit board 22 (and thus also the controller 20) is arranged or held on the housing part 16 designed in the present case as a metallic diecast housing (cf. FIG. 3).

To protect the electronic component parts arranged on the printed circuit board 22 from exposure to dust and spray water, a cover element 24 is attached to the housing part 16 designed as the diecast housing. As can be seen in particular in FIG. 1 in conjunction with FIG. 2 in this respect, the cover element 24 covers regions of the underside of the housing part 16 with respect to the surroundings of the display device 10 when the display device 10 is in the installation position (cf. FIG. 1).

The type of fixing of the cover element 24 or cover on the housing part 16 in the present case in the form of the metallic diecast housing shall be explained in more detail below.

In the present case, a plurality of screws 26 (cf. FIG. 3) are specifically provided to connect the cover element 24 to the housing part 16, said screws preferably being in the form of self-cutting plastic screws. A part of the screws 26 is screwed through the cover element 24 and the housing part 16 into a further component part 28, which is shown perspectively in the exploded diagram in FIG. 3. In the present case, this further component part 28 is designed as an optical chamber or shielding device, the purpose of which is in particular to prevent incidence of disruptive scattered light onto components of the image-generating unit 14 as far as possible.

In the perspective view of the display device 10 shown in FIG. 1 and FIG. 2, this further component part 28 is concealed partially by the housing part 16 (lower in FIG. 1) and partially by a housing part 30, upper in FIG. 1, of the display device 10, wherein the transparent covering 12 is arranged on the upper housing part 30 (cf. FIG. 1).

Not only the cover element 24 but also the upper housing part 30 is connected to the housing part 16, which in the present case is designed as a diecast housing. In particular, the upper housing part 30 can be screw-fastened to the diecast housing or fixed to the diecast housing in another suitable way, wherein the type of fixing does not need to be explained in more detail in the present case.

Figure 3:
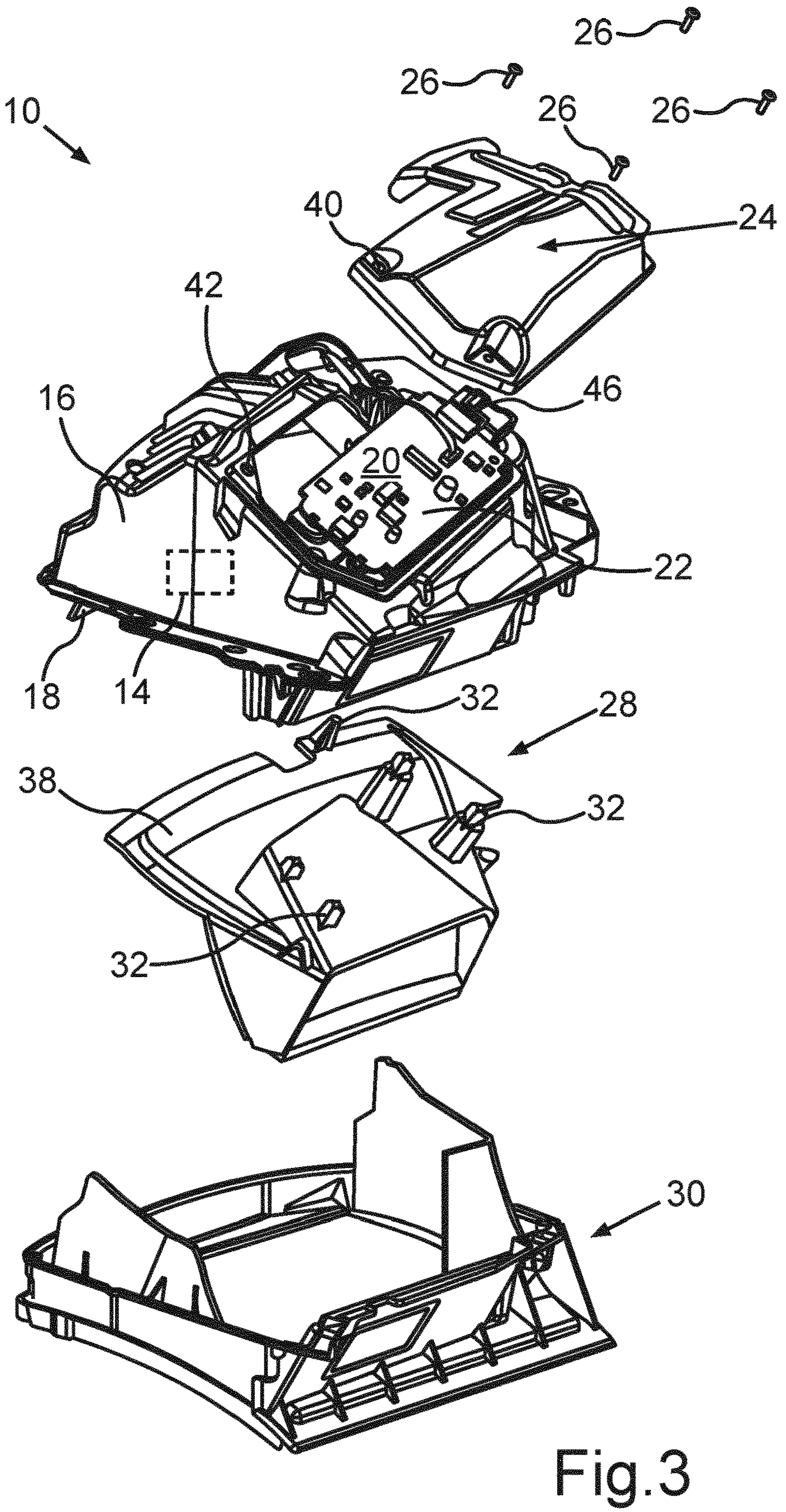
FIG. 3 shows an exploded diagram of components of the display device or head-up display in the perspective according to FIG. 2.

In accordance with the structure of the display device 10, which can be seen in particular in FIG. 3, the housing part 16 designed as a diecast housing is arranged in a sandwich-like manner between the further component part 28 in the form of the optical chamber and the cover element 24.

The further component part 28 is formed from plastic in the present case. Moreover, fastening domes 32 are formed on the further component part 28, wherein three such fastening domes 32 are provided by the further component part 28 in the embodiment of the display device 10 shown by way of example in FIG. 3. Three of the screws 26, which are likewise shown in FIG. 3, are inserted into these fastening domes 32 when the screws 26 connect the cover element 24 used as a covering to the underlying plastic part in the form of the further component part 28, through the housing part 16 (cf. FIG. 2).

Figure 4:
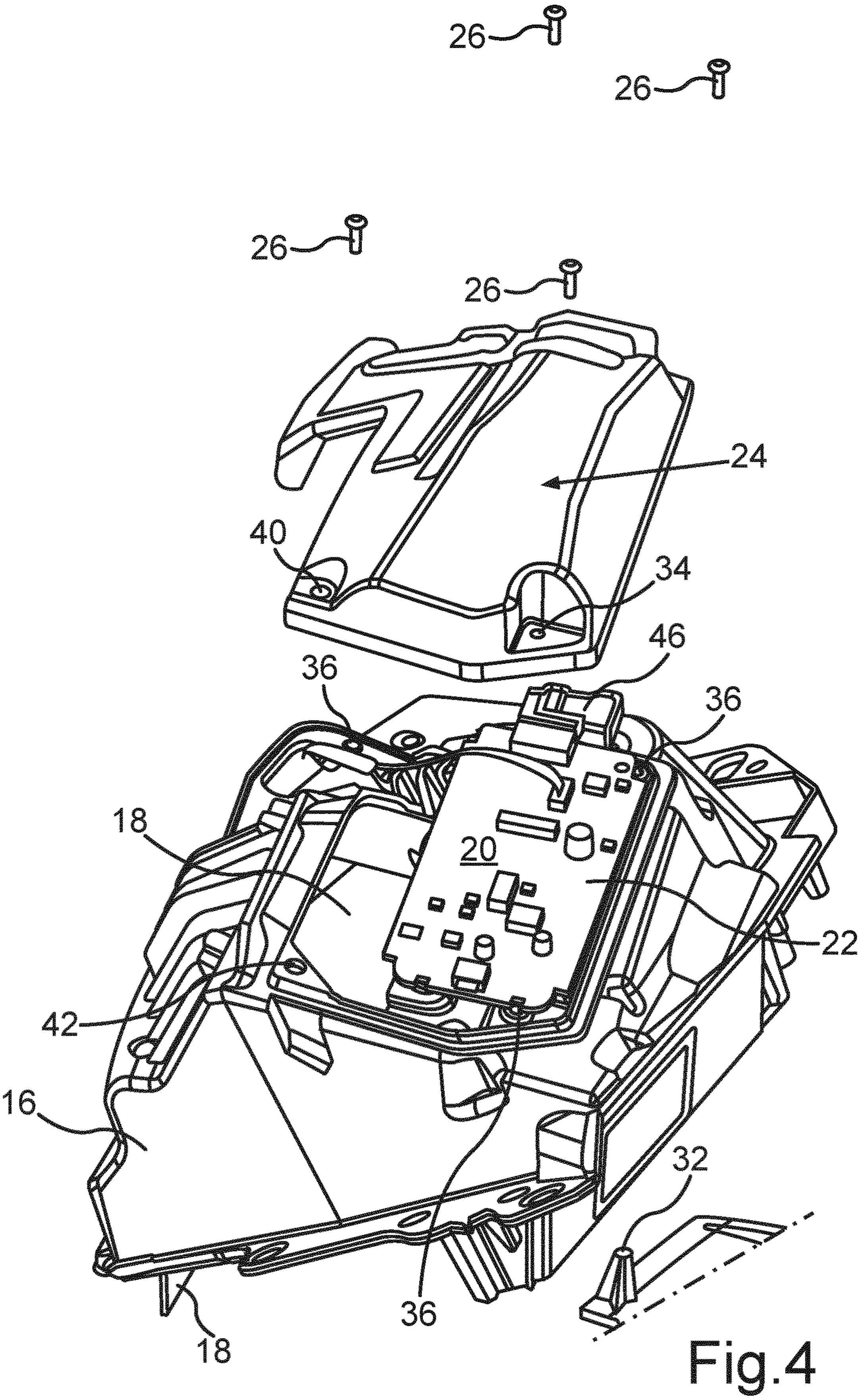
FIG. 4 shows a further exploded diagram of individual components of the display device in an enlarged perspective view.
Figure 5:
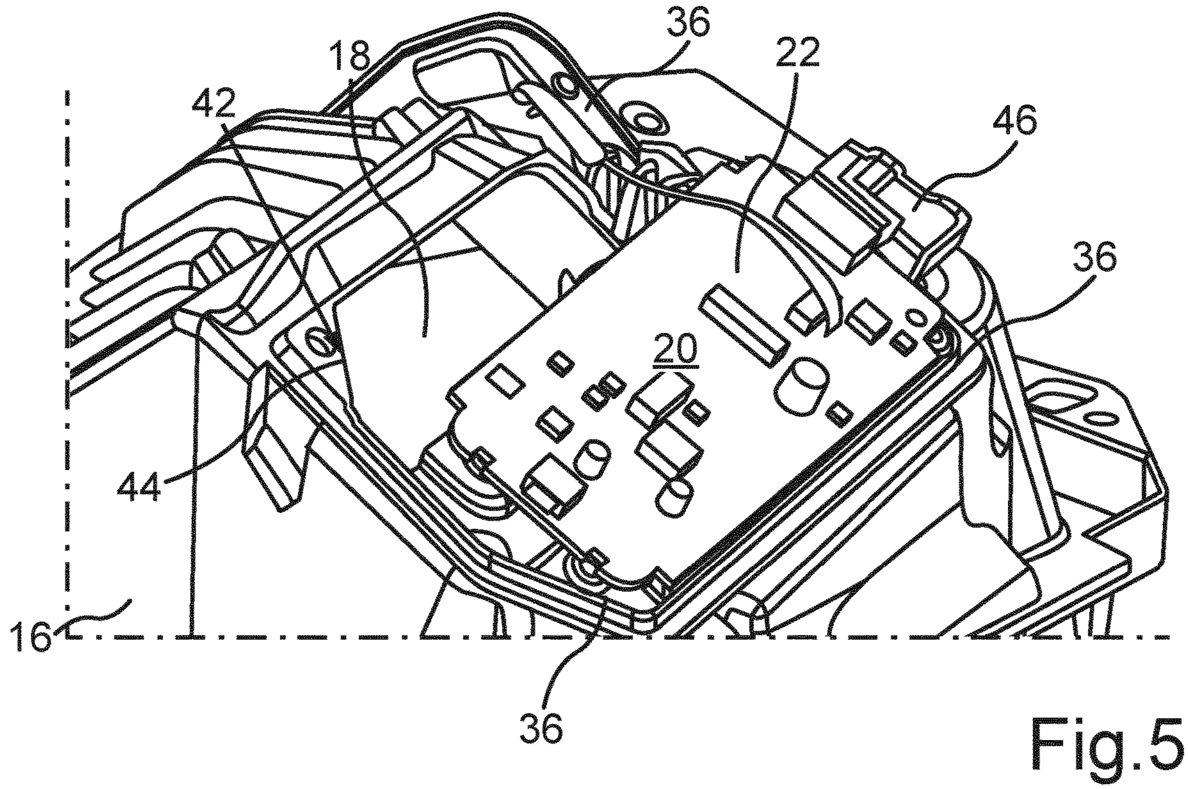
FIG. 5 shows a section of a housing part, in the form of a diecast housing, of the display device in an enlarged detail view.
Figure 6:
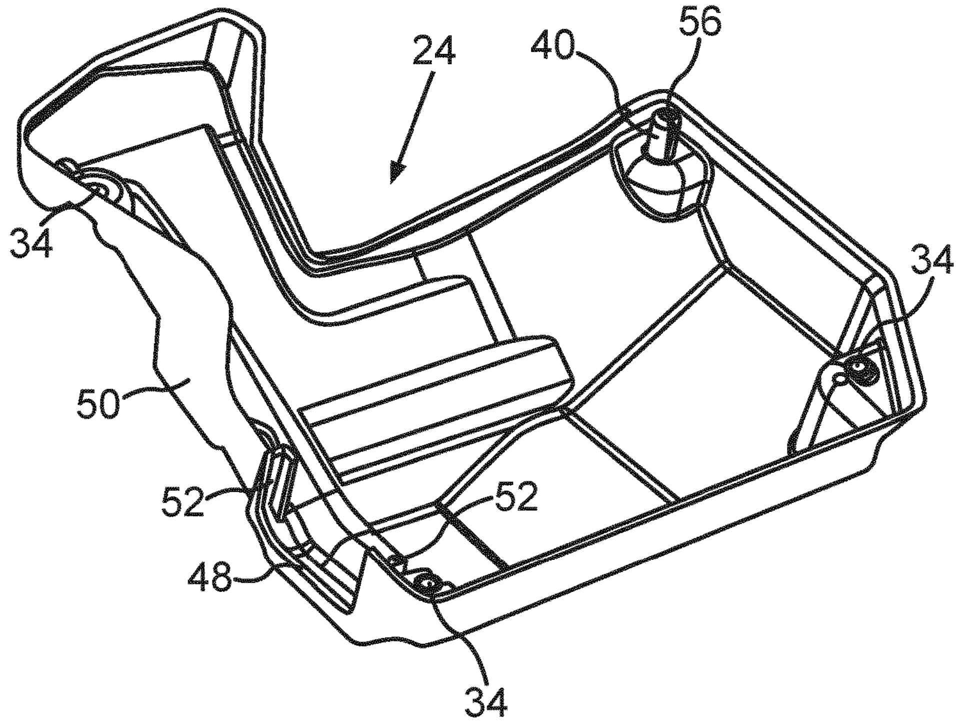
FIG. 6 shows the cover element of the display device in a perspective view toward an inside, the inside facing the diecast housing when the cover element is in the mounted state (cf.

In particular when FIG. 4 is viewed together with FIG. 6, it can be seen that respective through-openings 34 are formed in the cover element 24 for these three screws 26 and are arranged in respective corner regions of the cover element 24. According to FIG. 5 and FIG. 6, these through-openings 34 formed in the cover element 24 align with further through-openings 36 that are formed in the housing part 16 provided in the present case by the diecast housing.

However, in a corner region 38 of the further component part 28 (cf. FIG. 3), the further component part 28 is too far away from the cover element 24 to be able to implement a connection of the cover element 24 to the further component part 28 by means of the fourth screw 26 shown in FIG. 3. As is clear in particular when FIG. 4 and FIG. 6 are viewed together, the cover element 24 has a peg element 40 instead of the through-openings 34 in this corner region 38.

The peg element 40, which is formed in the manner of an anchor or expansion anchor, is inserted into a receptacle 42, which in the present case is designed as a drilled hole and is formed in the housing part 16 (cf. in particular FIG. 5), during production of the display device 10, specifically during mounting of the cover element 24 on the housing part 16.

After the peg element 40 has been inserted with play into the receptacle 42 designed as a drilled hole in the exemplary embodiment, the fourth screw 26 is screwed into the peg element 40 from an outside, facing the surroundings of the display device 10, of the cover element 24. In contrast, FIG. 6 shows the cover element 24 in a view toward its inside, wherein the inside of the cover element 24 faces the housing part 16 when the display device 10 is in the mounted state (cf. FIG. 1).

The (in this case fourth) screw 26 acts as a spreading piece on being screwed into the peg element 40 and results in an expansion of the peg element 40. In particular, two portions of the peg element 40 that are separated from one another at least in regions by a slot are moved away from one another in the process. This in turn has the effect that the peg element 40 is braced against a wall 44 that delimits the receptacle 42 in the circumferential direction (cf. FIG. 5). It can be seen in FIG. 6 that the portions or part-pieces of the peg element 40 can still be connected to one another at a free end 56 of the peg element 40 when the peg element 40 is still in the non-spread state.

In the present case, the peg element 40 is fixed in the receptacle 42 as a result of the expansion of the peg element 40. Preferably, the peg element 40 is held without play in the receptacle 42 as a result of the insertion of the screw 26 acting as a spreading piece into the peg element 40.

Advantageously, the screws 26, which are designed as identical parts in the present case, can be used in the form of the self-cutting plastic screws for cost-effective fixing of the cover element 24 acting as a covering to the housing part 16. To fix the cover element 24 on the housing part 16 or to connect the cover element 24 to the housing part 16, some, in the present case by way of example three, of the screws 26 are screwed through the housing part 16 or diecast housing into the optical chamber in the form of the further component part 28. The fourth screw 26 in the present case is used as the spreading piece.

Furthermore, a precise geometry for orienting the cover element 24 relative to the diecast housing or housing part 16 is provided by the peg element 40. In the present case, the peg element 40 is therefore used as a centering peg and at the same time as an anchor or expansion anchor for precise positioning and fixing of the cover element 24 on the housing part 16.

During production of the display device 10 or during mounting of the display device 10, the peg element 40 is preferably first inserted into the receptacle 42 with a clearance fit. When the screw 26 used as a spreading piece is then inserted or screwed into the peg element 40 from the surroundings of the display device 10, the associated expansion of the peg element 40 results in preferably play-free centering of the peg element 40 in the receptacle 42. Then, the further screws 26 are screwed into the associated fastening domes 32 provided on the further component part 28 (cf. FIG. 3).

It can be seen from FIG. 1 that a plug 46, used as an electrical connection device, of the display device 10 is accessible from the surroundings of the display device 10 when the display device 10 is in the mounted state.

As can be seen in particular when FIG. 1 and FIG. 6 are viewed together, this plug 46 is situated in the region of a U-shaped cut-out 48 formed in a side wall 50 of the cover element 24, which is hood-shaped in the present case. Because the plug 46 is arranged in the region of this cut-out 48 when the cover element 24 is mounted, a non-rotatable orientation of the cover element 24 in relation to the housing part 16 is ensured when the peg element 40 is inserted or introduced into the receptacle 42.

Figure 7:
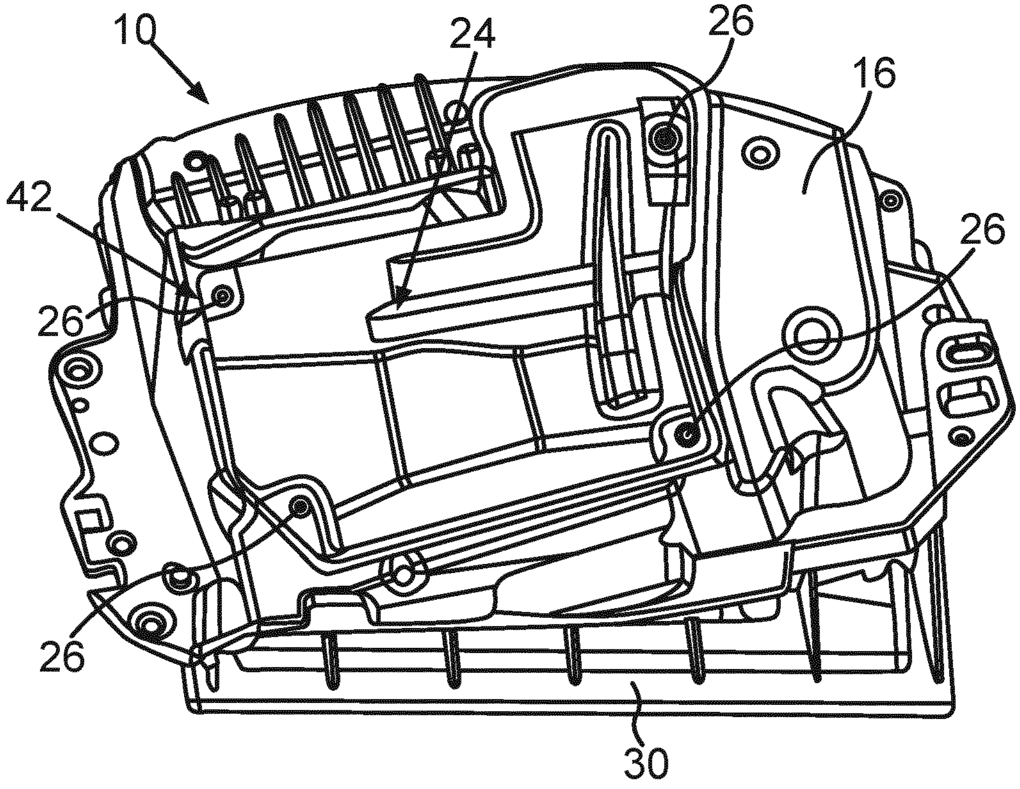
FIG. 7 shows a further perspective view of the display device.

FIG. 7 shows the display device 10 in a further view toward its underside, on which the cover element 24 is connected to the housing part 16. Visible here are both the screw 26, which has been screwed in in the region of the receptacle 42 to expand the peg element 40, and the further three screws 26, which are screwed into the fastening domes 32 of the further component part 28 (cf. FIG. 3).

Figure 8:
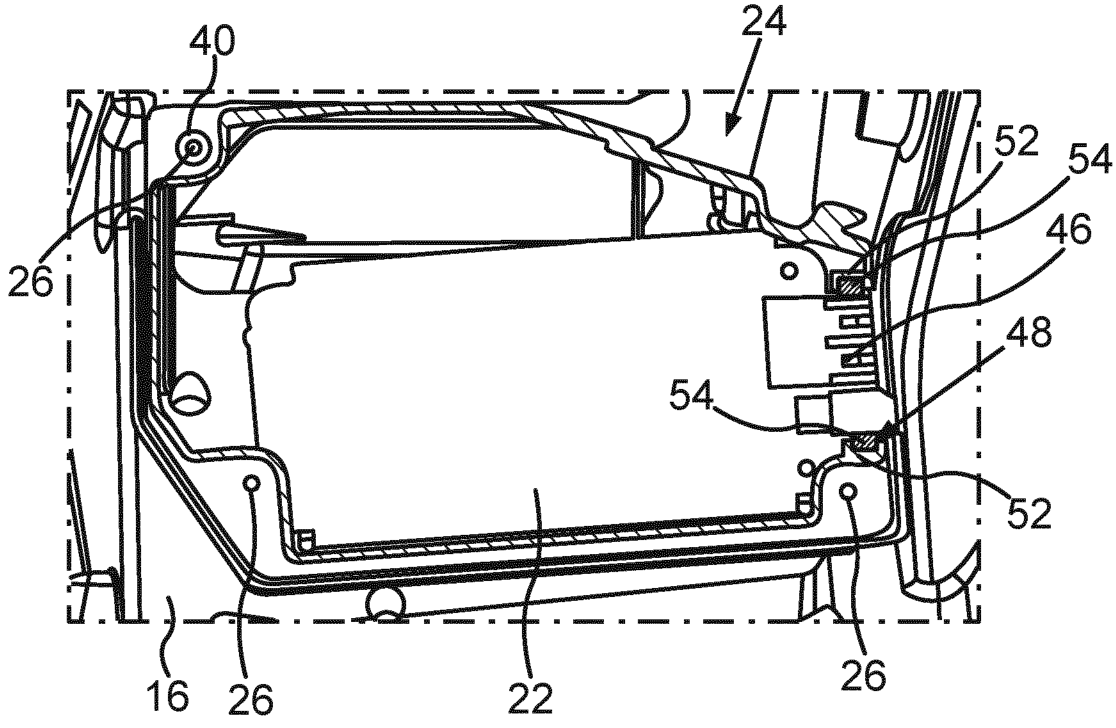
FIG. 8 shows a partially cut-away view of the display device, wherein the cover element is fixed to the diecast housing.

The arrangement of the cover element 24 relative to the plug 46, which is arranged on the printed circuit board 22, can in particular be seen easily in the partially cut-away diagram of the cover element 24 with the underlying printed circuit board 22 as shown in FIG. 8. Accordingly, a retaining groove 52, which fits around regions of a sealing element 54, is formed on the cover element 24 in the region of the cut-out 48. In other words, the sealing element 54 is held in regions in the retaining groove 52, which is formed integrally with the side wall 50 of the cover element 24 (cf. FIG. 6).

Figure 9:
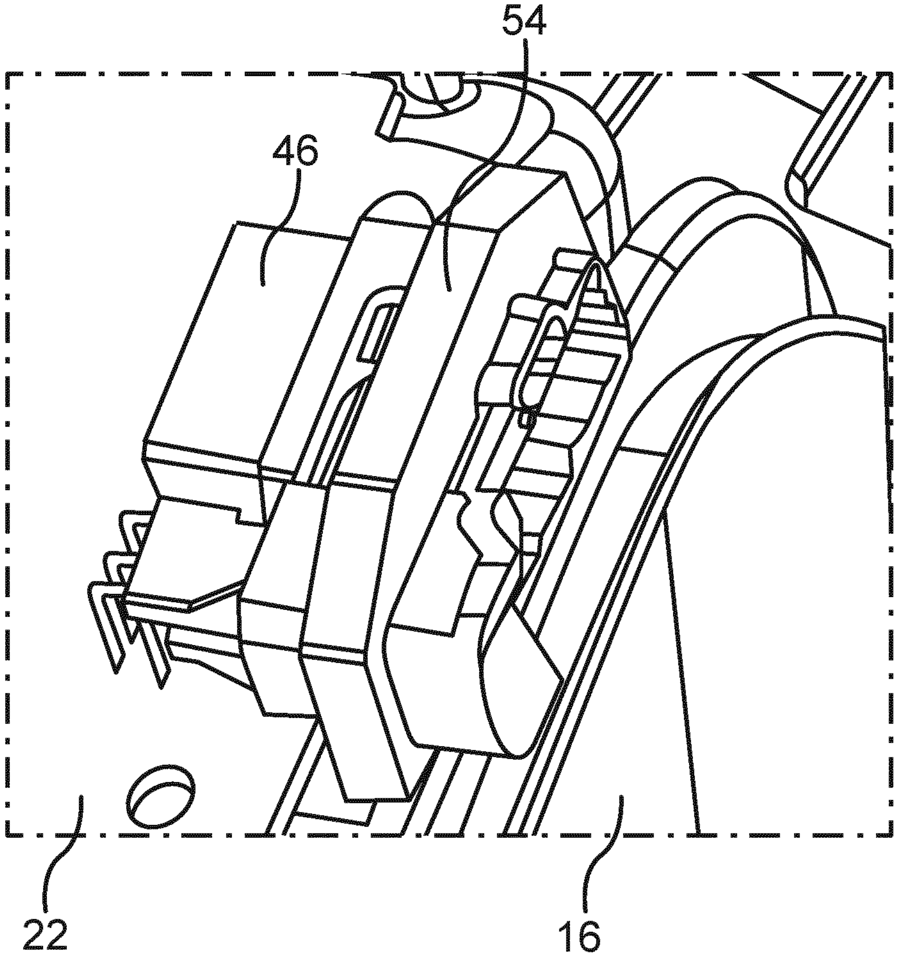
FIG. 9 shows an enlarged detail diagram of a sealing element in the form of a foam collar, by means of which an electrical connection device of the display device is sealed off.

FIG. 9 perspectively shows the sealing element 54, which fits around the plug 46 in a U shape. For example, the sealing element 54 can be formed from an elastic foam material in the manner of a foam collar. In this way, in particular a dust-tightness of the display device 10, formed in the present case as a head-up display, is ensured in the region of the plug 46 as well when the cover element 24 is connected to the housing part 16.

The invention claimed is:

1. A head-up display device for a motor vehicle, the device comprising a housing part, in which an image-generating unit of the display device is arranged, wherein the image-generating unit is configured to project an image onto a light-permeable projection surface, and wherein the image-generating unit comprises a cover element, which is connected to the housing part and covers regions of the housing part with respect to the surroundings of the display device, wherein the cover element comprises a peg element, which is inserted into a corresponding receptacle formed in the housing part, wherein the peg element is expanded with a spreading piece inserted into the peg element, wherein the peg element is fixed in the receptacle as a result of the expansion.

2. The head-up display device as claimed in claim 1, wherein, as a result of the expansion, the peg element is braced against a wall that delimits the receptacle, wherein the receptacle is a drilled hole.

3. The head-up display device as claimed in claim 1, wherein the cover element is connected to the housing part by at least one further fastening means, which is different from the peg element.

4. The head-up display device as claimed in claim 3, wherein the at least one fastening means is arranged through a through-opening formed in the housing part, and wherein the at least one fastening means is fixed to a further component part of the display device.

5. The head-up display device as claimed in claim 4, wherein the further component part comprises at least one fastening dome, wherein the further fastening means is inserted into the at least one fastening dome.

6. The head-up display device as claimed in claim 4, wherein the further component part is formed from a a plastic, and wherein the housing part formed from metal.

7. The head-up display device as claimed in claim 4, wherein the further component part is configured as a shielding device, wherein the shielding device reduces an exposure of at least one component of the image-generating unit to scattered light.

8. The head-up display device as claimed in claim 3, wherein the spreading piece or the at least one further fastening means is configured as a screw that is formed from a plastic and is self-cutting.

9. The head-up display device as claimed in claim 3, wherein the peg element, which is formed integrally with a main body of the cover element, and the at least one further fastening means are arranged in respective corner regions of the cover element.

10. The head-up display device as claimed in claim 1, wherein a cut-out is formed in a side wall of the cover element, wherein an electrical connection device of the display device is accessible from the surroundings of the display device via the cut-out, wherein the side wall is sealed off from the electrical connection device in the region of the cut-out by a sealing element.

11. The head-up display device as claimed in claim 10, wherein the side wall comprises, in the region of the cut-out, a retaining groove, wherein the retaining groove fits around regions of the sealing element, which wherein the sealing element is formed from an elastic foam material.

12. A method for producing a head-up display device for a motor vehicle, the method comprising:

arranging an image-generating unit of the display device in a housing part;

connecting the image-generating unit to a cover element of the display device, wherein the image-generating unit is configured to project an image onto a light-permeable projection surface, wherein the cover element covers regions of the housing part with respect to the surroundings of the display device, wherein the cover element comprises a peg element;

inserting the peg element into a corresponding receptacle formed in the housing part; and expanding the peg element with a spreading piece inserted into the peg element, wherein the peg element is fixed in the receptacle as a result of the expansion.

* * * * *